(12) United States Patent
Luker

(10) Patent No.: US 9,827,819 B2
(45) Date of Patent: Nov. 28, 2017

(54) ELECTRONIC BACKING/HITCHING SYSTEM

(71) Applicant: James Howard Luker, Roebuck, SC (US)

(72) Inventor: James Howard Luker, Roebuck, SC (US)

( * ) Notice: Subject to any disclaimer, the term of this patent is extended or adjusted under 35 U.S.C. 154(b) by 0 days.

(21) Appl. No.: 15/070,399

(22) Filed: Mar. 15, 2016

(65) Prior Publication Data
US 2017/0174024 A1  Jun. 22, 2017

Related U.S. Application Data

(63) Continuation-in-part of application No. 14/975,723, filed on Dec. 19, 2015, now abandoned.

(51) Int. Cl.
| | |
|---|---|
| *B60D 1/40* | (2006.01) |
| *B60Q 5/00* | (2006.01) |
| *B60Q 1/00* | (2006.01) |
| *B60D 1/06* | (2006.01) |
| *G08G 1/0962* | (2006.01) |
| *H04W 84/00* | (2009.01) |
| *H04L 29/08* | (2006.01) |
| *G08G 1/16* | (2006.01) |

(52) U.S. Cl.
CPC ............ *B60D 1/40* (2013.01); *B60D 1/065* (2013.01); *B60Q 1/0023* (2013.01); *B60Q 5/005* (2013.01); *G08G 1/0962* (2013.01); *H04L 67/00* (2013.01); *H04W 84/00* (2013.01); *G08G 1/165* (2013.01)

(58) Field of Classification Search
CPC ........ B60D 1/40; B60D 1/065; B60Q 1/0023; B60Q 5/005; G08G 1/0962; G08G 1/165; H04L 67/00; H04W 84/00
See application file for complete search history.

(56) References Cited

U.S. PATENT DOCUMENTS

| | | | | |
|---|---|---|---|---|
| 3,938,122 | A * | 2/1976 | Mangus | B60D 1/38 280/477 |
| 2005/0068133 | A1* | 3/2005 | Romanik | H01H 36/0033 335/207 |
| 2009/0192658 | A1* | 7/2009 | Wofford, Jr. | B62D 15/028 701/2 |

* cited by examiner

*Primary Examiner* — Brian Zimmerman
*Assistant Examiner* — Sara Samson
(74) *Attorney, Agent, or Firm* — McNair Law Firm, P.A.; Douglas L. Lineberry

(57) ABSTRACT

An electronic backing/hitching system that assists drivers with connecting towing devices such as trailers, haulers, etc., to ball hitches attached or affixed to vehicles.

18 Claims, 11 Drawing Sheets

ELECTRONIC BACKING/HITCHING SYSTEM

The current application is a continuation-in-part of U.S. application Ser. No. 14/975,723, filed Dec. 19, 2015, which is incorporated herein in its entirety.

BACKGROUND OF THE INVENTION

1) Field of the Invention

The present invention relates to an electronic backing/hitching system that assists drivers with connecting towing devices, such as trailers, haulers, etc., to ball hitches attached or affixed to a vehicle.

2) Description of Related Art

Anyone that has attempted to reverse a vehicle into position to attach a trailer coupler to a ball hitch on the vehicle appreciates that this is a tedious task. Often, the driver must make numerous attempts to guide the ball hitch into position under the coupler attached to the trailer being hauled. Even experienced drivers must make several attempts to position the ball hitch sufficiently under the coupler so that lowering the coupler will result in the ball hitch residing within the coupler cavity.

A single operator often must exit and reenter the vehicle several times while slowly moving the vehicle back in order to position the ball hitch under the coupler. Typically, a second person is needed to instruct the driver how to reverse the vehicle until the ball hitch is located under the coupler. Often, the driver "cheats" when the trailer or hauling device is light weight by simply moving the coupler into position over the hitch when the vehicle is relatively close. However, with heavy loads, this is impossible.

What is needed in the art is a simplified way to position a ball hitch under the coupler of a trailer without requiring the driver to make numerous back and forward movements of the vehicle or requiring the presence of a second person to guide the driver. A system is needed so that a single person can quickly and efficiently place the ball hitch of a vehicle under a coupler precisely.

SUMMARY OF THE INVENTION

The above objectives are accomplished according to the present invention by providing a backing assistance mechanism for attaching a hitch to a towing device. In one embodiment a line is placed in communication with a rotating trigger. The rotating trigger is movably affixed to a shaft for rotational, side to side, and axial, forward and backward, movement upon the shaft. The device includes at least one movement trigger, at least one movement indicator, at least one transmitter, at least one receiver; and signaling indicia. Further, the at least one movement trigger may comprise a magnet. Still further, the at least one movement indicator may comprise a reed switch. Even further, the device may include a lower movement indicator. Further still, the lower movement indicator may be formed from multiple movement indicators. In a further embodiment, the signaling indicia may comprise visual indicia. Still further, the signaling indicia may comprise auditory indicia. Further, the rotating trigger may include at least one movable flange. In a further embodiment, the device may include a distance detection unit. Even further, the device may include an activating device on the line. Further yet, the rotating trigger may include at least one elliptical shaped opening.

In an alternative embodiment, a method is provided for positioning a hitch with relation to a towing device. The method includes affixing a line between a towing device and a backing unit: the backing unit includes a rotating trigger in communication with the line. Movement of the line, which causes movement of the rotating trigger, is translated into signals. Instructions are generated from the signals informing of approaching the towing device. The instructions may be visual or auditory. Signals may be generated based on interaction between at least one movement indicator and at least one movement trigger. Still further, the at least one movement indicator may comprise a magnet. Even further, the at least one movement trigger may comprise a reed switch. Still further, the signals may comprise radiofrequency signals.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
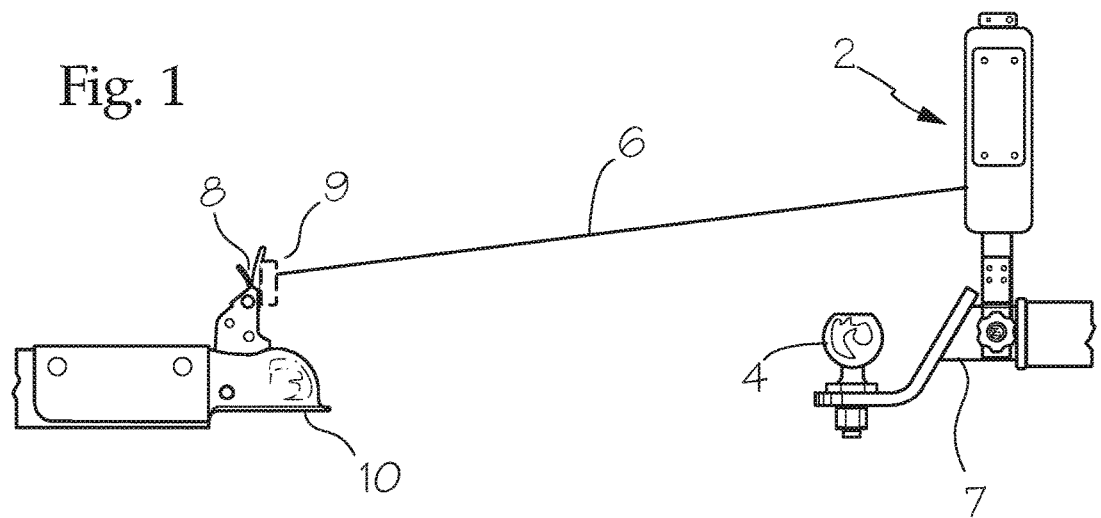
FIG. 1 shows an electronic hitching/backing system of the current disclosure affixed to a ball hitch.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

FIG. 1 shows an electronic hitching/backing system 2 of the current disclosure affixed approximate a ball hitch 4 with line 6 extending between electronic hitching/backing system 2 and locking mechanism 8 of coupler 10. System 2 is positioned atop hitch attachment bar 7 with line 6 extending overtop of ball hitch 4. Line 6 may comprise plastics, synthetics, metals, string, twine, monofilaments, multifilaments, braided structures, etc., as known to those of skill of the art and may include various types of lines including string, fishing line, nylon cord, polymeric strands, metal, plastic, etc., as known to those of skill in the art. Line 6 is capable of repeatedly extending from and retracting into system 2. Line 6 also includes activating device 9, which may comprise a knot, clamp, raised area, fitting, grommet, etc., as known to those of skill in the art, on line 6. In a preferred embodiment, activating device 9 may be a knot tied in line 6. The knot may be a releasable knot in order to allow the user to reposition activating device 9 to accommodate different style or size vehicles.

Figure 2:
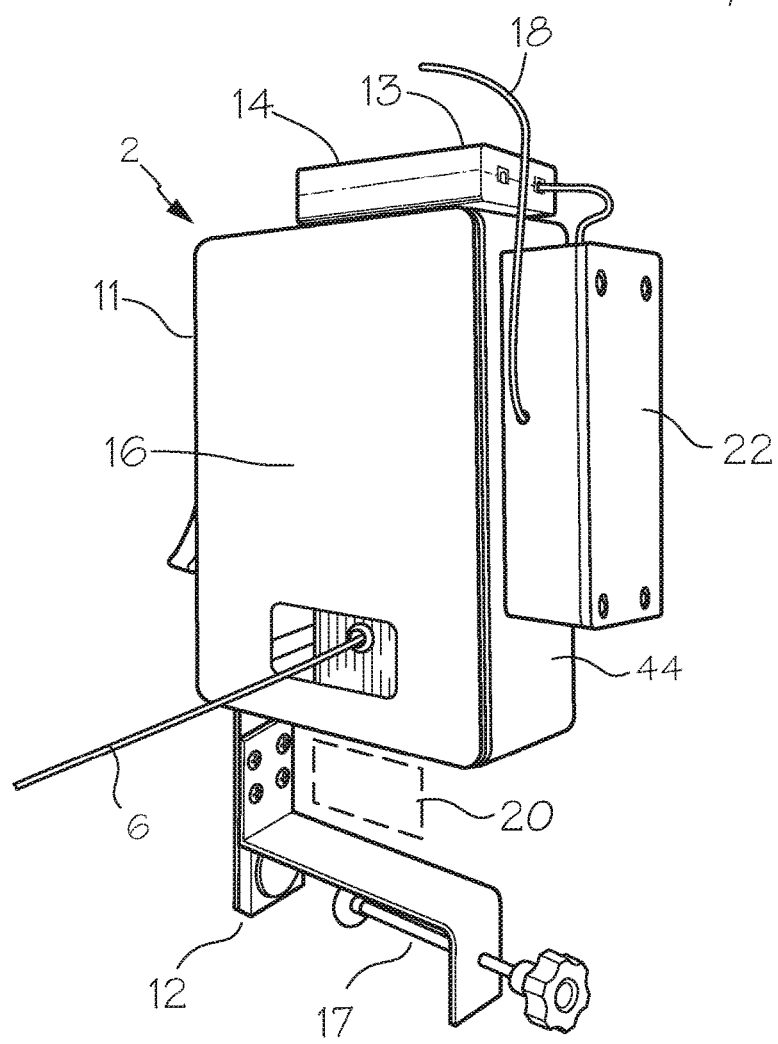
FIG. 2 shows a front view of an electronic hitching/backing system of the current disclosure.

FIG. 2 shows a close-up view of electronic hitching/backing system 2. Mounting bracket 12 serves to removably attach system 2 to hitch attachment bar 7, see FIG. 1. While shown as a roughly 'U' shaped bracket that would fit overtop hitch attachment bar 7 using a threaded bolt 13 to engage hitch bar 7, other configurations are considered within the scope of this disclosure. For instance, mounting bracket 12 may comprise magnets, frictional engagement devices, such as spring loaded clamps, flexible engagement fixtures such as prongs configured with some give in order that slip over hitch attachment bar 7 and grip same tightly, and other attachment means as known to those of skill in the art. In a further embodiment, system 2 may be permanently affixed to hitch attachment bar 7 by welding, adhesives, etc., as known to those of skill in the art.

Casing 11 of system 2 may be formed from metal, plastics, polymers, synthetics, etc., as known to those of skill in the art. Battery compartment 14 may provide power to system 2 and may contain a switch 13 allowing system 2 to be set for settings such as "on", "off", "backing", and "hitching" in order to allow a user to select modes of operation for system 2 when in use. For instance, battery compartment 14 may allow a user to reconfigure system 2 from a hitching setting, wherein system 2 aids with associating ball hitch 4 with coupler 10 to a backing setting wherein system 2 would aid the user with backing the trailer by indicating when the driver had allowed coupler 10 to deviate from being straight with respect to system 2. Various batteries, not shown, as known to those of skill in the art may be used to power system 2. Battery compartment 14, while shown as a separate section of system 2 may also be integral with casing 11. In a further embodiment, battery compartment 14 may be contained within casing 11 and positioned on the interior of system 2.

In an alternative method of use, system 2 may be affixed to the towing device, either permanently or removably, with line 6 extending from the towing device to the vehicle. In this arrangement, a magnetic rod or stand, not shown, extending 2 to 4 inches above ball hitch 4 of the vehicle, could be used to secure line 6 at an appropriate height with respect to system 2 in order to provide reliable signals. Further, system 2 could be configured to have switch 13 have a setting for a "reverse configuration" wherein system 2 is affixed to the towing device and not the vehicle. This would require the system transposing 'right' and 'left' as system 2 would be oriented opposite to its configuration when attached to the vehicle instead of the towing device.

Front cover 16 may be removed from system 2 in order to expose the interior of system 2. In other embodiments, front cover 16 may be formed integral with casing 11 and not removable. Antennae 18 may be formed from wire or other antennae materials as known to those of skill in the art. While antennae 18 is shown external of casing 11, it too may be positioned within casing 11 to form a self-contained device that minimizes hang points and potential areas for snagging and damaging system 2. Ultrasonic detection unit 20 may also be included with system 2. In one embodiment, an ultrasonic distance detector, such as an Arduino HC-SR04, may be used to establish connection with the transmitter. Ultrasonic detection unit 20 may be used to detect the distance of ball hitch 4 from coupler 10 in order to serve as a back-up or additional system to guide the driver while backing using system 2.

Figure 3:
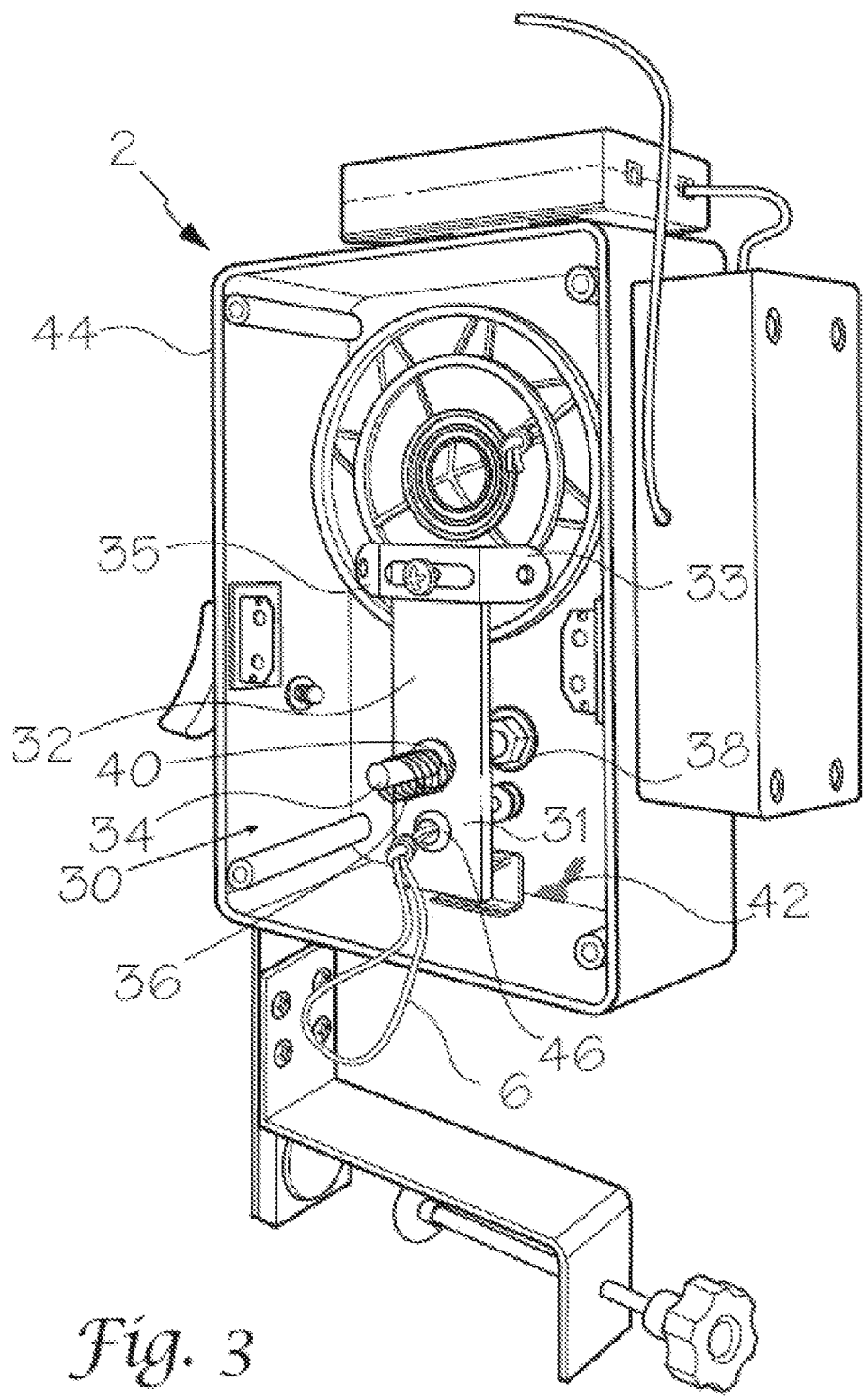
FIG. 3 shows an electronic hitching/backing system of the current disclosure with its front cover removed.

FIG. 3 shows electronic hitching/backing system 2 with front cover 16, not shown, removed. Interior 30 may contain a rotating trigger 32. Rotating trigger 32 may be formed from metal, plastics, polymers, synthetics, etc., as known in the art. Rotating trigger 32 may be made from plastics, synthetics, metals, etc., as known to those of skill in the art. Rotating trigger 32 is affixed to shaft 34 such that rotating trigger 32 may move in an arcuate manner with respect to shaft 34 as well as slide axially along shaft 34. This range of motion may range from moving 90 degrees to the "left" or "right" with respect to shaft 34, as well as smaller arcs such as that over 80, 70, 60, 50, 45, 40, 30, 20, 10, or 5 degrees with respect to shaft 34. In one embodiment, rotating trigger 32 may have a range of motion of −30 to +30 with respect to being located at 90 degrees to shaft 34 (essentially in an upright position). While shown as formed from a long section 31 with flanges 33 and 35 extending from the upper portion of long section 31, rotating trigger 32 may be formed so that either or both flange 33 and 35 are integral with long section 31. In one embodiment, flanges 33 and 35 may be adjustable with respect to long section 31 so that flanges 33 and 35 may be adjusted in order to "fine tune" the system with respect to different sized vehicles, towing devices, etc. In another embodiment flanges 33 and 35 may be integral with long section 31. Rotating trigger 32 may be affixed to shaft 34 with forward spring 36 placed on shaft 34 between rotating trigger 32 and front cover 16. Shaft 34 is affixed to back 42 of housing 44 An opening 38 may be formed in rotating trigger 32 and a bushing 40 may be inserted into opening 38 to keep rotating trigger 32 movably positioned on shaft 34 such that rotating trigger 32 may move in an arcuate manner as well as forward and back on shaft 34. Rotating trigger 32 may also include a trigger opening 46 that allows line 6 to extend through the rotating trigger 32 through trigger opening 46. While trigger opening 46 is shown as circular, other shapes are considered within the scope of this disclosure.

Figure 4A:
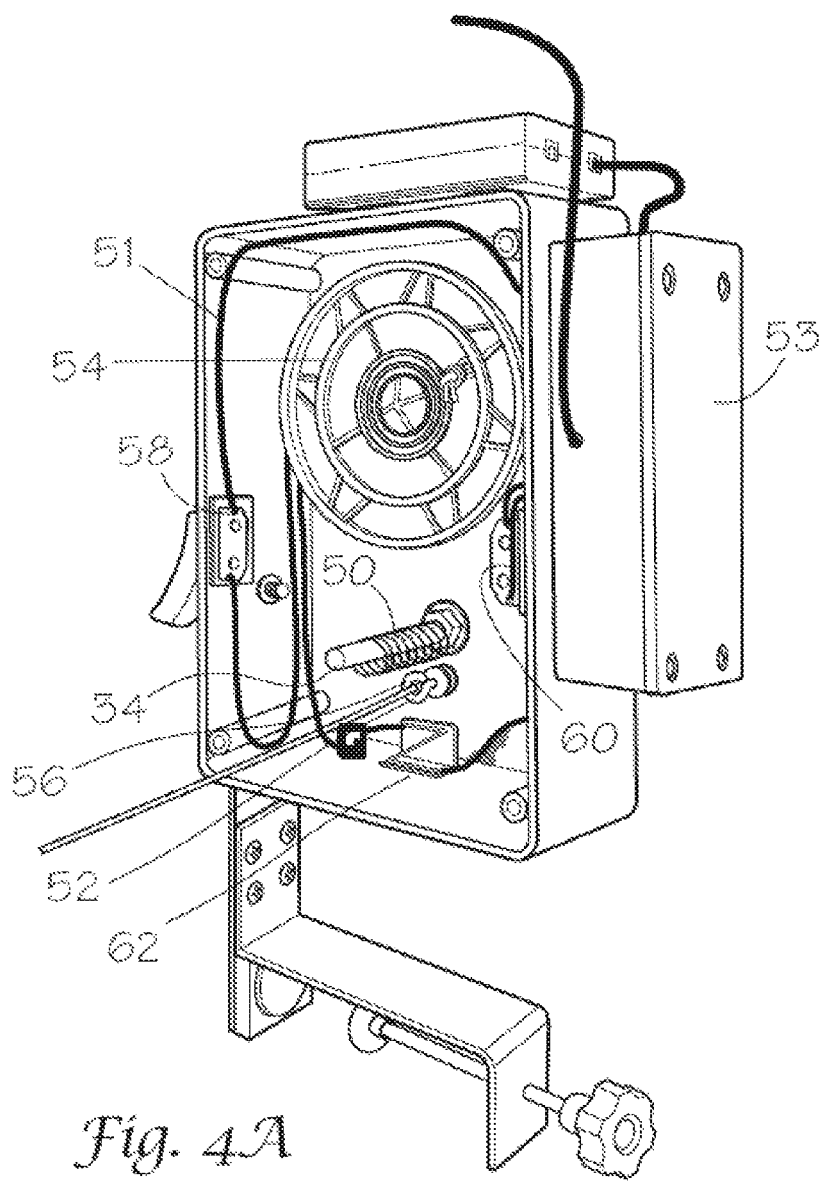
FIG. 4A shows an electronic hitching/backing system of the current disclosure with rotating trigger 32 removed.

FIG. 4A shows system 2 with rotating trigger 32 removed. Rearward spring 50 is shown on shaft 34. Also shown is line guide 52, which aids in passing line 6 from rewinding spool 54 through trigger opening 46 by positioning line guide opening 56 so that line 6 passes through trigger opening 46 with respect to rotating trigger 32. Rewinding spool 54 is configured in order to place tension on line 6 and allow an operator to extend line 6 in order to affix it to the trailer or towing device that will be connected to the hitch on the operator's vehicle. Rewinding spool 54 may be a plastic housing with a steel recoil spring with enough pull to overcome rearward coil spring 50. Various angles of engagement are contemplated by this disclosure such that line 6 may encounter rotating trigger 32 at angles ranging over 180 degrees, including 180, 170, 160, 150, 140, 130, 120, 110, 100, 90, 80, 70, 60, 50, 40, 30, 20, and 10 degrees, as well as ranges of these angles or specific angles located between the angles described above. While various angles are possible for line 6 to enter trigger opening 46 and rotating trigger 32, in a preferred embodiment, line 6 will encounter the rear of rotating trigger 32, not shown, at approximately a 90 degree angle to long section 31 of rotating trigger 32. Having line 6 enter trigger opening 46 at approximately 90 degrees allows for rotating trigger 32 to remain roughly parallel in position with respect to back 42 of system 2. If rotating trigger 32 is canted to the right or left due to line 6 entering trigger opening 46 at an angle other than approximately 90 degrees, this may cause "false positives" when system 2 is used due to line 6 snagging or frictionally engaging rotating trigger 32 and moving it axially or arcuately on shaft 34. This, in turn, may cause the operator to improperly position their vehicle during the hitching process.

System 2 may also include movement indicators 58, 60 and 62 that interact with rotating trigger 32 to inform the operator of how they should reverse their vehicle to properly position it with respect to a hitch. While only three movement indicators are shown, more or less movement indicators are contemplated by this disclosure such as 1, 5, or 7 movement indicators. For purposes of example only, left movement indicator 58, right movement indicator 60, and lower movement indicator 62, in one embodiment, may comprise reed switches.

A reed switch is an electrical switch operated by an applied magnetic field that consists of a pair of contacts on ferrous metal reeds in a hermetically sealed glass envelope. The contacts may be normally open, closing when a magnetic field is present, or normally closed and opening when a magnetic field is applied. The switch may be actuated by a coil, making a reed relay, or by bringing a magnet near the switch. Once the magnet is pulled away from the switch, the reed switch will go back to its original position.

In one embodiment, at least three triggering devices 72, 74, and/or 76, which in one embodiment may be magnets such as electromagnets, permanent magnets, or other magnets as known to those of skill in the art, will cause the reeds to come together when rotating trigger 32 moves the respective triggering device into proximity with a movement indicating by rotating trigger 32 moving arcuately or axially on shaft 34, thus completing an electrical circuit.

Left triggering device 72, right triggering device 74, and lower triggering device 76 are positioned on rotating member 32 such that when a triggering device comes into a predefined proximity with its respective movement indicator, this causes an electrical circuit to form due to activating the movement indicator, such as for purposes of example only, closing a reed switch and thereby creating an electrical circuit. For example, left triggering device 72 is matched or paired with left movement indicator 58, right triggering device 74 is paired with right movement indicator 60, and lower triggering device 76 is matched or paired with lower movement indicator 62. In an alternative embodiment, infrared beams interacting with sensors or laser beams interacting with appropriate sensors may be used in association with rotating trigger 32 to indicate course corrections to the driver. This may be used instead of magnets. The circuit is completed by wiring 51 that may connect movement indicators 58, 60, and 62 to transmitter unit 53.

In a further embodiment, movement indicator 62 may be structured to be more sensitive than left and right movement indicators 58 and 60. This may be achieved by, for purposes of example only and not intended to be limiting, comprising the lower movement indicator of multiple reed switches in various positions with respect to one another and "sistering" the switches as known to those of skill in the art, such as a Z-configuration wherein at least three reed switches form a 'Z' shape within system 2, see alternative lower movement indicator 61 in FIG. 5B. This configuration prevents "blind spots" or gaps with respect to the lower movement indicator sensing activating device 9 overcoming rearward spring 50 and axially moving rotating trigger 32 closer to lower movement indicator 62 along shaft 34.

Because of line 6 being engaged with rotating trigger 32 via trigger opening 46, small movements in line 6 are exaggerated in rotating trigger 32, thereby causing triggering devices 72, 74, and 76 to move closer to their respective movement indicators 58, 60, or 62 based on the position of line 6 with respect to rotating trigger 32 and its affixation on shaft 34. These movements are then converted into signals and then used to direct the driver as to how to correct course as explained herein.

Figure 4B:
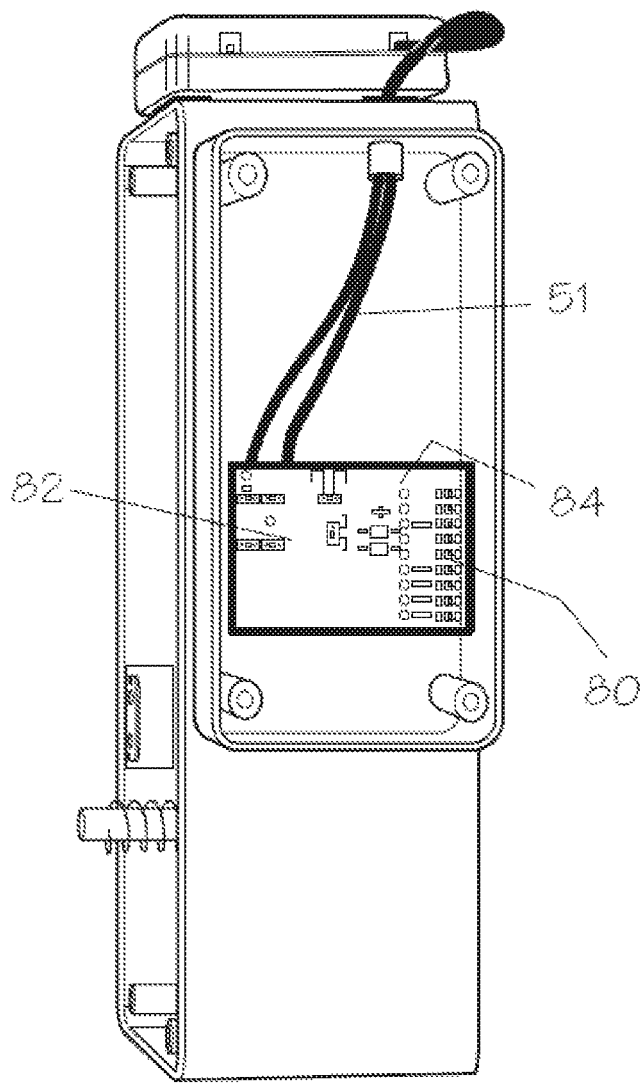
FIG. 4B shows an internal view of a transmitter unit for an electronic hitching/backing system of the current disclosure.

FIG. 4B shows an internal view of transmitter unit 53. Wiring 51 connects control board 80, which includes an encoder 82 and a transmitter 84, to movement indicators 58, 60, and 62. In one embodiment, an XLPCF20 Transmitter may be employed that includes an encoder and decoder. Transmitter unit 53 may use encoder 82 to encode signals received from movement indicators 58, 60, and 62 and communicate the encoded signals wirelessly via transmitter 84, such as for purposes of example only and not intended to be limiting, a radiofrequency transmitter, with a receiver unit, not shown, positioned in the cab of the vehicle with the operator. The signals control board 80 receives from movement indicators 58, 60 and 62 via wiring 51 may be transmitted to the receiver wirelessly such as via radiofrequency or other means as known to those of skill in the art. In an alternative embodiment, the system of the current disclosure could be hard wired to the vehicle. Control board 80 may also communicate with ultrasonic detection unit 20, not shown, either via a wired or wireless connection, and transmit this data to the operator via the receiver, which may inform the driver of distances between the vehicle and objects behind it and/or impending collisions with same, such as through beeps or other auditory warnings transmitted through a speaker, not shown, or other means as known to those of skill in the art including visual cues.

Figure 4C:
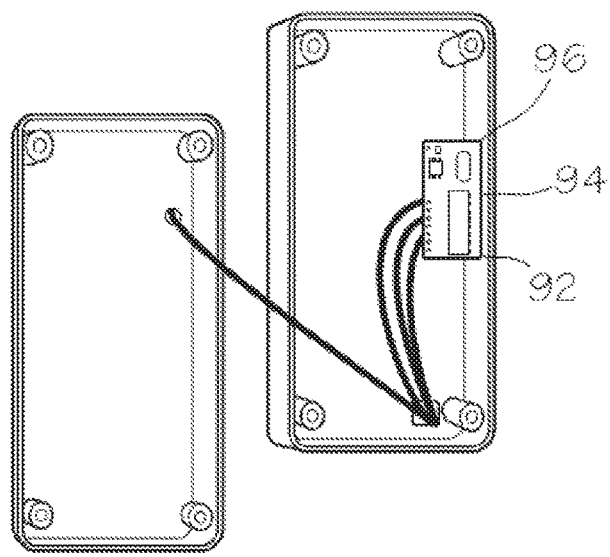
FIG. 4C shows an internal view of a receiver for an electronic hitching/backing system of the current disclosure.
Figure 4D:
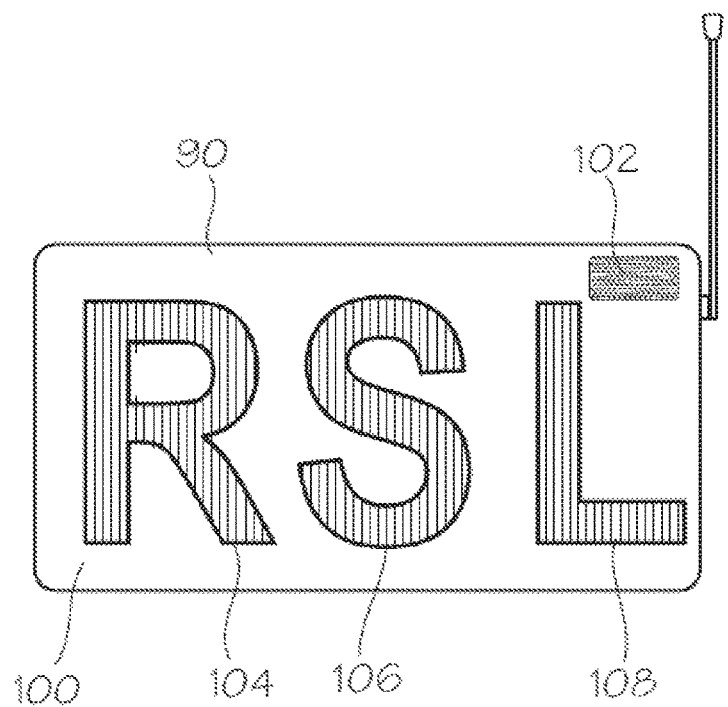
FIG. 4D shows a front view of a receiver for an electronic hitching/backing system of the current disclosure.

FIG. 4C shows an internal view of receiver 90. The signal, not shown, sent by transmitter 80, is received by receiver board 92, which includes a decoder 94, which decodes the signals from transmitter 80. After decoding, decoder 94, which is in either wired or wireless communication with signaling indicia 100, see FIG. 4D, which shows a front view of receiver 90. In one embodiment, receiver 90 may include visible indicia, such as lettering, arrows, different colored lights, etc., as known to those of skill in the art, to direct the operator. In a further embodiment, receiver 90 may include a speaker 102 for providing verbal or auditory indicia to the driver. Such as a voice indicating, "turn the steering wheel right", "stay straight", "stop", "turn the wheel left", etc. In one embodiment, it is envisioned that the receiving unit will instruct the driver to maintain course by indicating "stay straight" or provide other cues in order to maintain contact with the driver even though no signals have been received by the receiver from the transmitter. This may be accomplished by having an internal timer 96 that will signal the receiver to inform the driver to maintain course when no signal has been received from the transmitter for a predetermined amount of time such as 1 second, 2 seconds, 5 seconds, etc.

In one embodiment, lettering such as 'IR' (Right) 104, 'S' (Stop) 106, and 'L' (Left) 108 may be employed on receiver 90. The corresponding letter may light up when a signal is received by receiver board 92 and decoded by decoder 94. For instance, if the driver needs to turn the wheel to the right given the placement of line 6 with respect to rotating trigger 32, the 'IR' signal may light up to inform the driver to turn the wheel to the right. If the driver has positioned the locking mechanism 8 over ball hitch 4, 'S' may light up to indicate the driver should stop the vehicle. If the driver needs to turn the steering wheel left based on the input from system 2, the 'L' will light up to inform the driver to turn the steering wheel to the left.

Figure 5A:
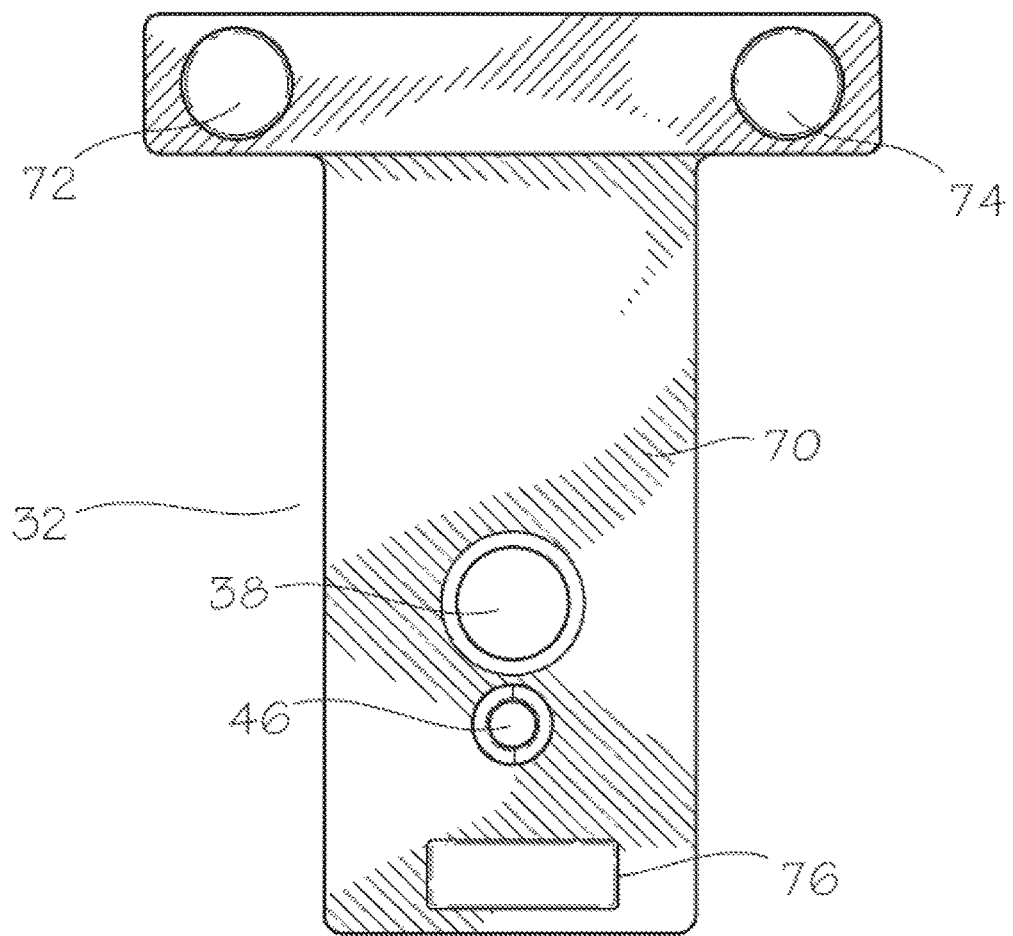
FIG. 5A shows a first embodiment of a rear surface of a rotating trigger of the current disclosure.

FIG. 5A shows a first embodiment of rear surface 70 of rotating trigger 32. Rotating trigger 32 may include at least one triggering device. For purposes of example only and not intended to be limiting, in one embodiment, triggering devices 72, 74, and 76 may be magnets. For example, magnet 72 may be affixed to rear surface 70. The affixation means may include glue, welding, etc., as known to those of skill in the art. In a preferred embodiment, rear surface 70 may include at least three magnets, left magnet 72, right magnet 74, and lower magnet 76. Based on the position of rotating trigger 32, magnets 72, 74 and 76 may trigger various of the movement indicators 58, 60, and 62.

For example, when movement indicators 58, 60 and 62 comprise reed switches, the proximity of left magnet 72 to movement indicator 58, caused by the angle of string 6 moving rotating trigger 32, may activate movement indicator 58, thus completing the circuit including the reed switch and sending a signal, not shown, to control board 80, through encoder 82, to decoder 94 to activate the appropriate signal indicating the driver needs to turn the steering wheel to the right to correct course in order to place locking mechanism 8 over ball hitch 4.

Figure 5B:
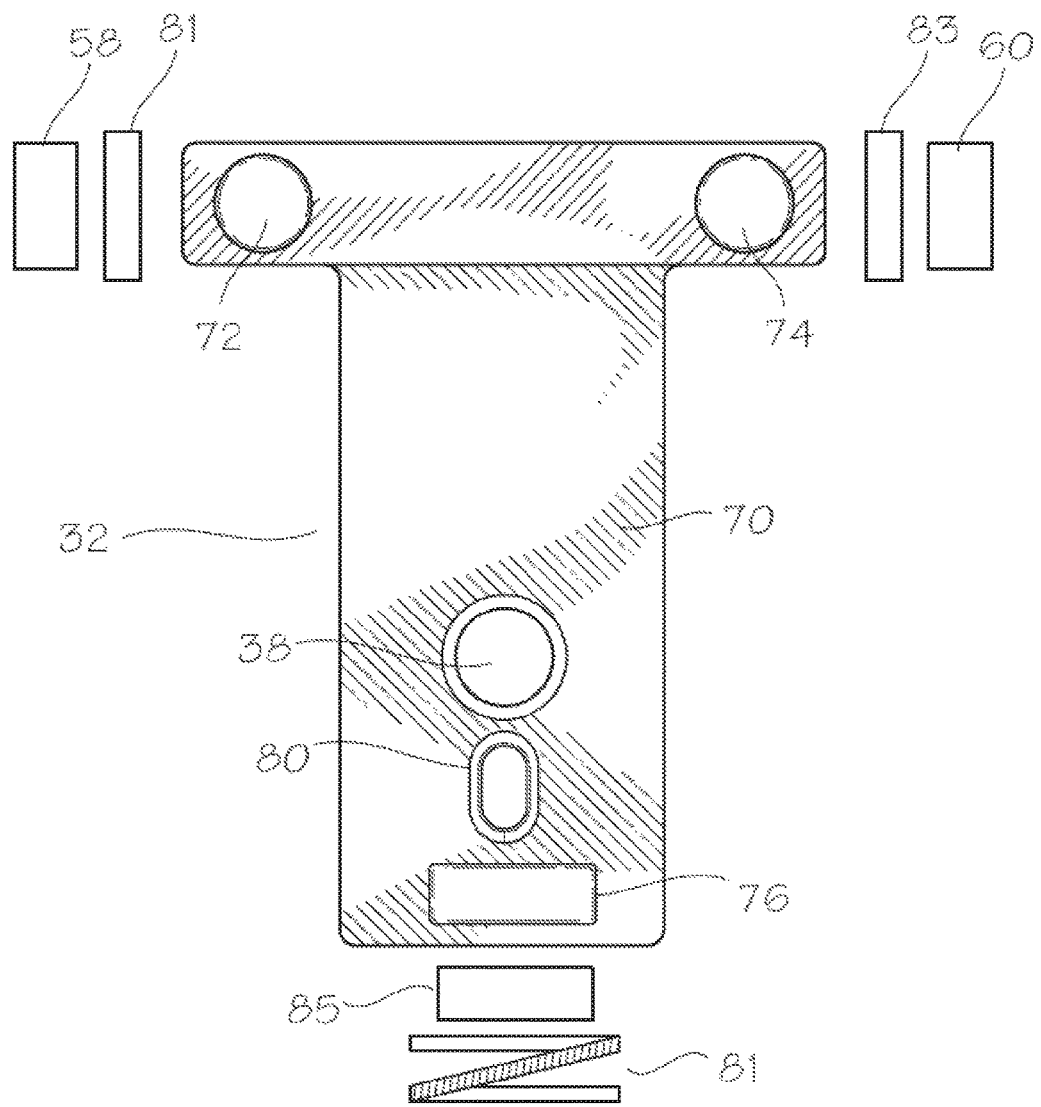
FIG. 5B shows an alternative embodiment of a rear surface of a rotating trigger of the current disclosure.

FIG. 5B shows an alternative embodiment of rear surface 70 of rotating trigger 32 wherein trigger opening 80 is formed into a slot, oval, or elliptical shape in order to allow line 6 to not only extend through rotating trigger 32, but also be capable of upward and downward movement within trigger opening 80. This arrangement allows line 6 to have upward and downward movement within trigger opening 80. This prevents friction from line 6 generating false positives with respect to lower movement indicator 76 due to line 6 "grabbing" or otherwise causing rotating trigger 32 to move axially on shaft 34 closer to movement indicator 61, wherein moving closer may signal the driver to stop prematurely due to line 6 snagging or otherwise causing rotating trigger 32 to move closer to lower movement indicator 62 not based on distance to the towing device.

FIG. 5B also illustrates a further embodiment of the invention wherein a secondary set of movement indicators: secondary left movement indicator 81, secondary right movement indicator 83, and secondary lower movement indicator 85, may be incorporated into system 2. In this embodiment, the driver may use switch 13, not shown, or other means known in the art, on system 2 to deactivate the movement indicators 58, 60 and 62, which are used when moving a vehicle into position with a towing device, and activate secondary movement indicators 81, 83, and 85. Activation of these indicators may be used once the towing device is attached in order to help the driver back the towing device in a straight line. Secondary movement indicators 81, 83, and 85 would be positioned closer to triggering devices 72, 74, and 76, respectively. In a further embodiment, secondary lower movement indicator 85 may be comprised of multiple indicators as explained with respect to alternative lower movement indicator 61.

Figure 5C:
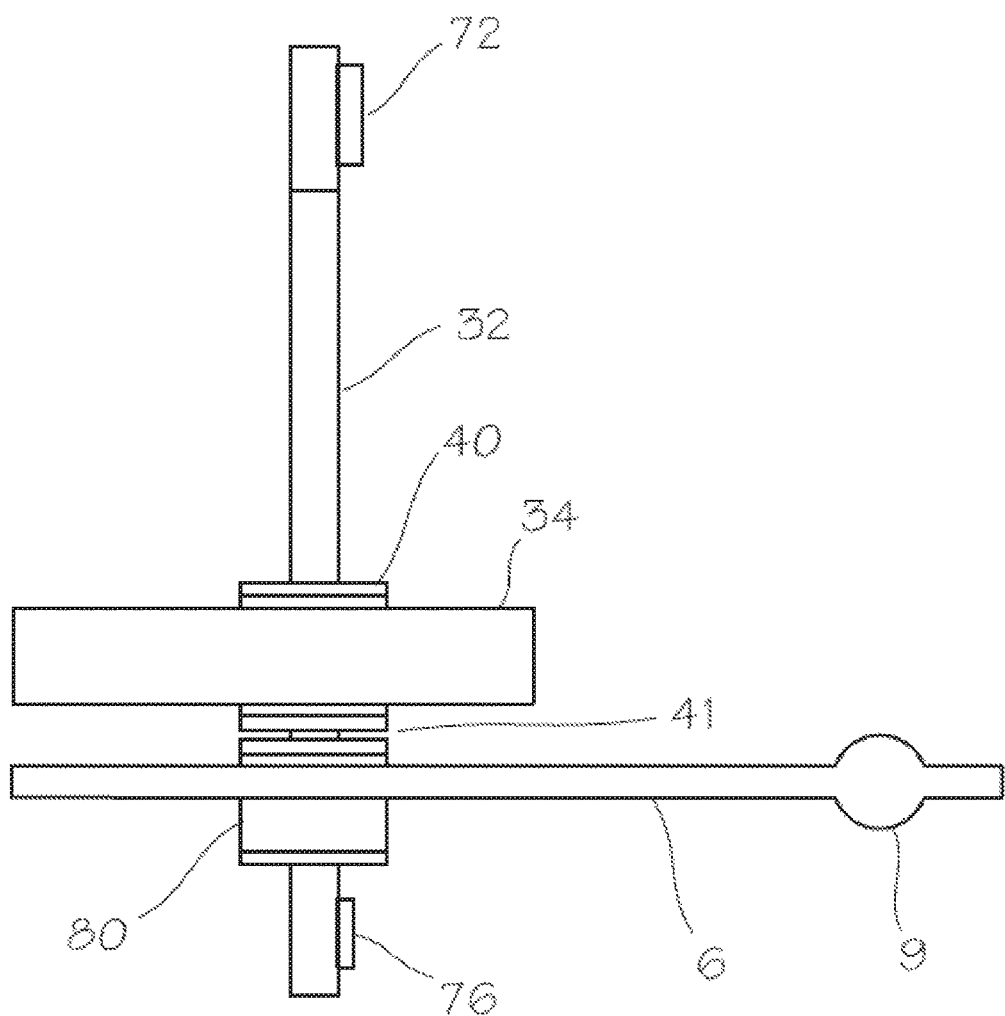
FIG. 5C shows a side view of a rotating trigger of the current disclosure.

FIG. 5C shows a side view of rotating trigger 32. In this view, a second bushing 41 may be used with trigger opening 80.

Figure 6:
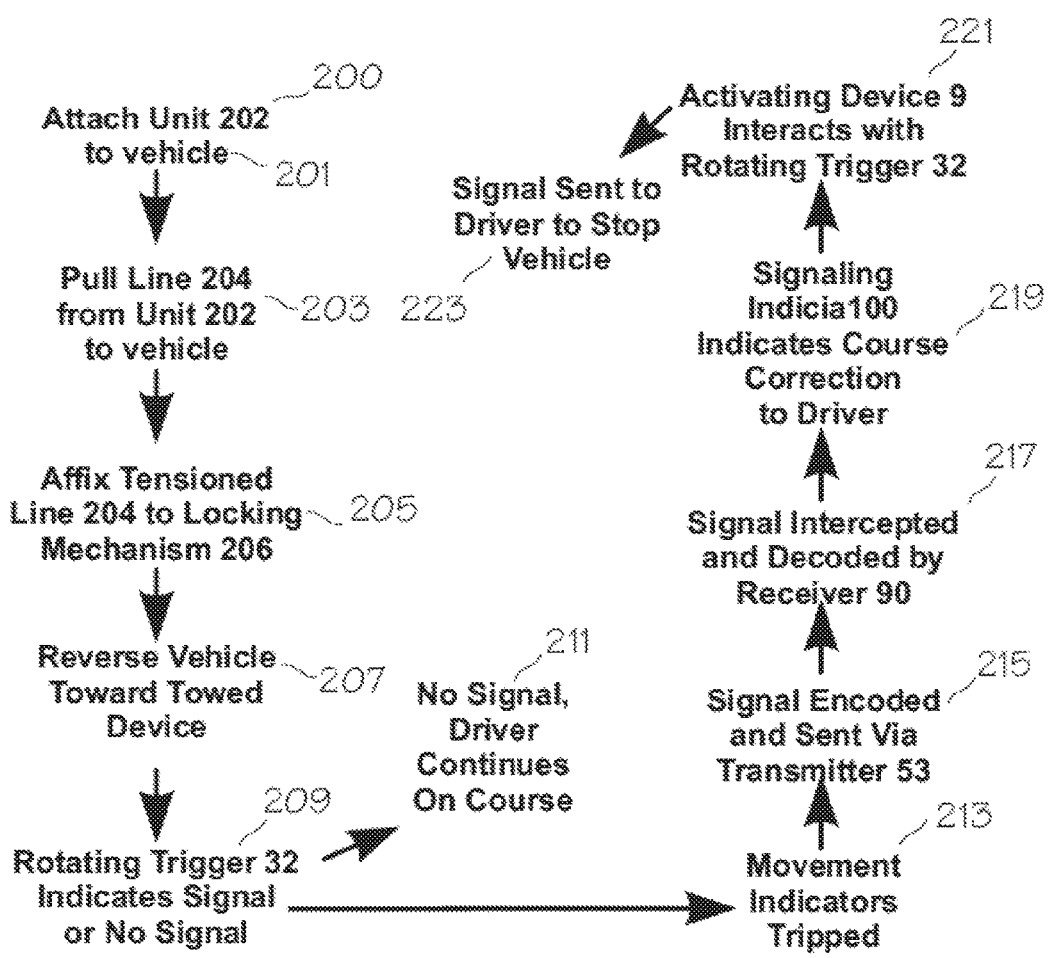
FIG. 6 illustrates a method for efficiently and quickly attaching a towing device using an electronic hitching/backing system of the current disclosure.
Figure 7:
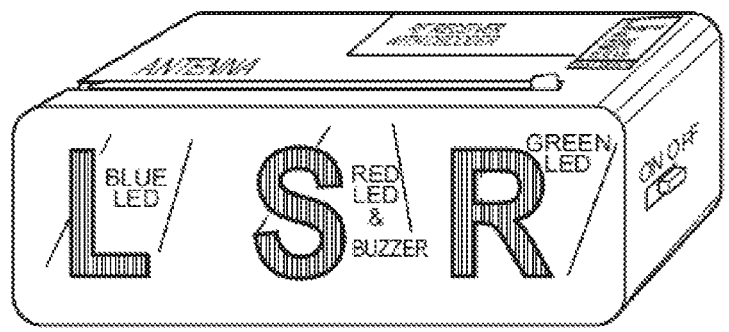
FIG. 7 illustrates an alternative embodiment of a receiver of the current disclosure.
Figure 7A:
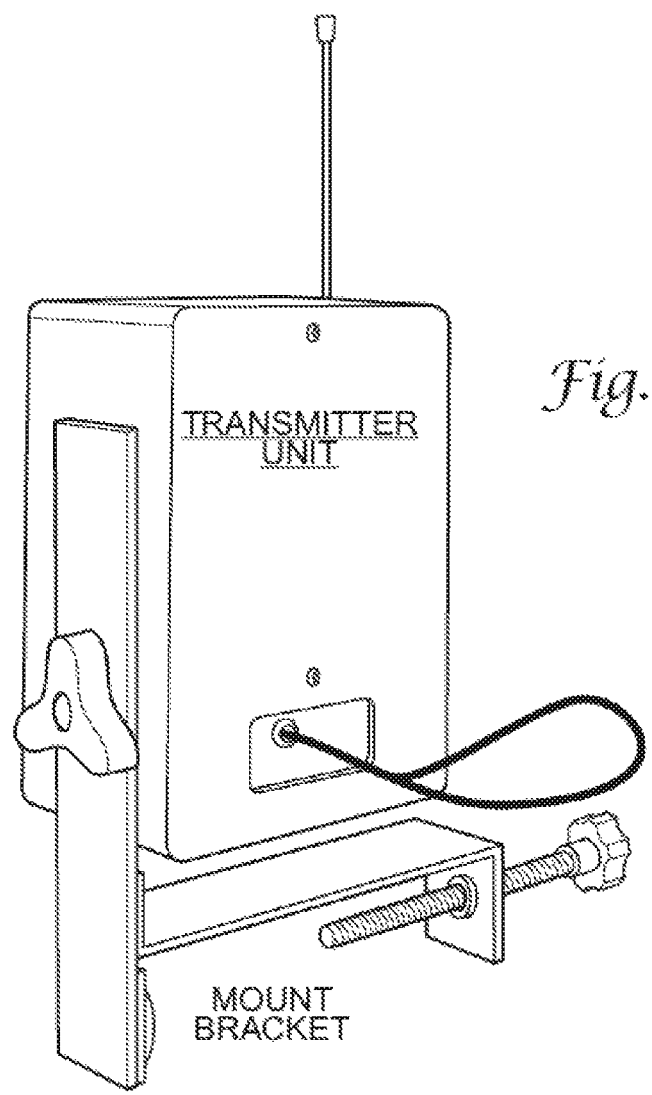
FIG. 7A illustrates an alternative embodiment of a transmitter of the current disclosure.

Referring to FIG. 6, in a further embodiment, a method 200 for efficiently and quickly attaching a towing device, such as a hauler, trailer, etc., to a ball hitch is provided. At step 201, the vehicle operator, not shown, attaches unit 202, which is powered on, to the rear of the driver's vehicle. At step 203, the operator then pulls line 204 from unit 202. Line 204 is under tension from rewinding spool 54. The operator then, at step 205, attaches line 204 to locking mechanism 206 on the trailer or device to be towed, not shown. Next, step 207, the driver then proceeds to enter the vehicle cab and reverse the vehicle toward the towing device. At step 209, the position of rotating trigger 32 on shaft 34, which is influenced by activating member 9, forward spring 36 and rearward sprint 50 to position rotating trigger 32 between rewinding spool 54 and front cover 16, based on the frictional engagement of line 204 with trigger opening 46, dictates whether movement indicators 58, 60 and 62 in unit 202 are triggered by the proximity of movement triggers 72, 74, and 76 on rotating trigger 32. If no movement indicator is triggered, the driver maintains course as no signal has been generated via unit 202, or alternatively, the driver receives a "maintain course" signal.

If a movement indicator is triggered by line 204 changing the arcuate position of rotating trigger 32, and thereby the position of movement triggers 72 and 74, with respect to shaft 34 and movement indicators 58 and 60 this causes, at step 215, a signal to be encoded and sent from transmitter 53. At step 217, the signal is intercepted by receiver 90 and decoded. Upon decoding, the signal then activates signaling indicia 100, which directs the driver to change course by turning the vehicle's steering wheel left or right. At step 221, once activating device 9 of line 204 engages rotating trigger 32 as line 204 is retracted into unit 202 as the vehicle moves closer to the towing device by contacting or otherwise influencing rotating trigger 32 at step 221. In one embodiment, activation may be caused by activating device 9 pressing against rotating trigger 32 and moving it axially on shaft 34 so that movement indicator 62 is triggered. At step 223, the activation of rotating trigger 32 causes a signal to be sent through transmitter 53 and decoded by receiver 90 to indicate to the driver, via signaling indicia 100, to stop the vehicle as ball hitch 4 is now located underneath locking mechanism 206 and the two may then be engaged to one another.

As stated in the parent application of this application, The Backer Buddy Electronic Trailer Hitching Unit guides a driver in connecting a vehicle to a trailer. The driver simply backs the tow vehicle within 15 to 20 feet of the trailer tongue. The Backer Buddy is then attached to the receiver hitch, as described below, and the guide line is pulled from its spool until the guide line loop will reach the trailer coupling release latch (on top of the trailer coupling). From here LED's illuminate instructions for the driver to turn the steering wheel left, right, or stop all together as he/she slowly backs the tow vehicle toward the trailer.

Figure 8:
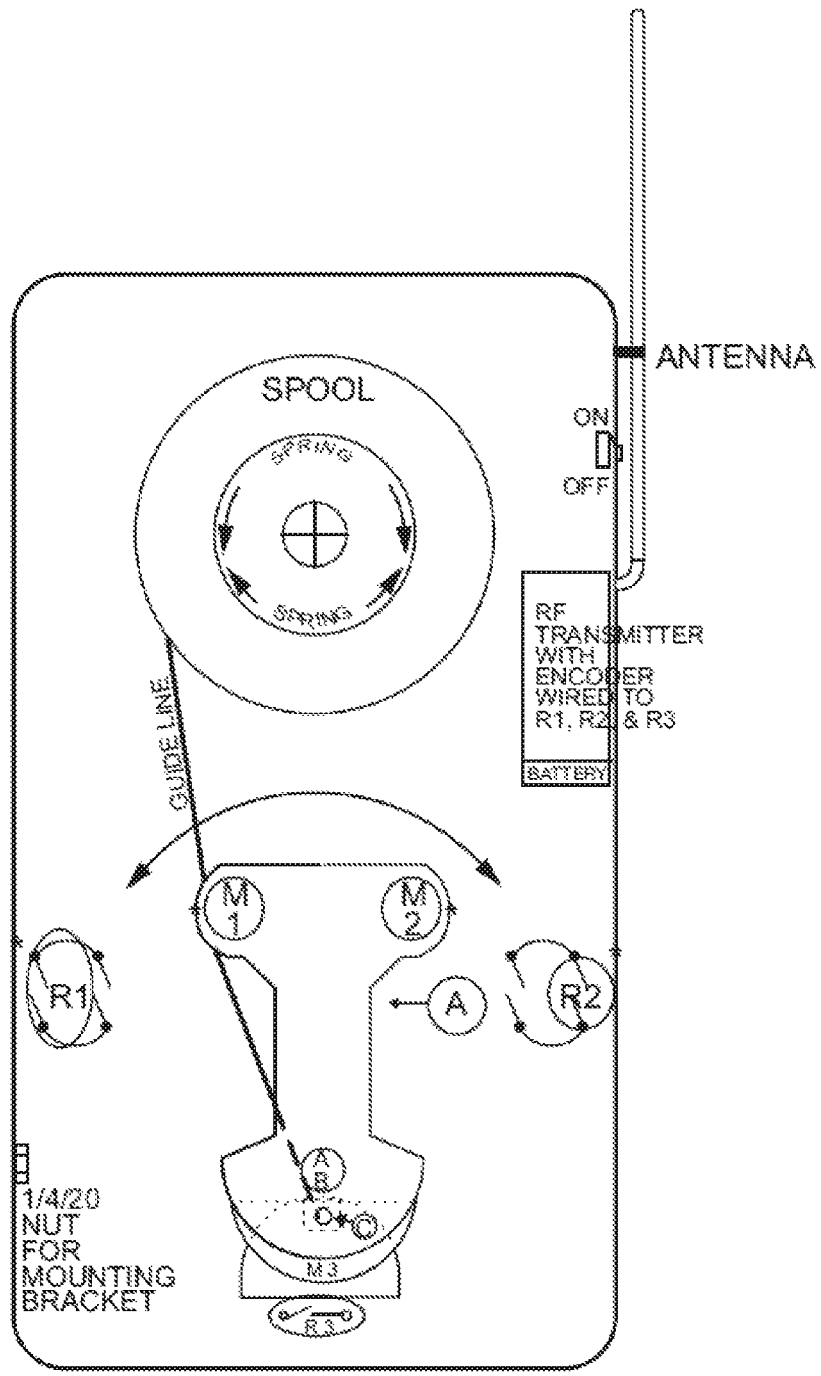
FIG. 8 is an internal view of the view of FIG. 7A.

With respect to FIG. 8, part A rotates about axis Aft limited by (x) points near MI and R1 and M2 and R2. Part A's rotation is driven by the guide line running through hole©. If the guide line is moved left or right MI or M2 is caused to move in the opposite direction and with an exaggerated amount. MI, M2, and M3 are all magnets. RI, R2, and R3 are magnetic reed switches (their contacts close when a magnet draws near). R3 is operated when an expanded portion of the guide line will no longer pass through hole C and the rearward coil spring about axis AB is compressed, allowing magnet M3 to come close to reed switch R3. The spool and spring within provide the force needed to accomplish this. The reed switch contacts are wired to an encoder and RF transmitter which sends the proper signal to an RF receiver and decoder unit. The receiver unit illuminates the signaled LED and/or buzzer to tell the driver to turn the steering wheel left, right, (while slowly backing to the trailer) or to stop all together.

The bracket holds the transmitter unit and clamps between the ball and the pulling vehicles body, on the receiver hitch tube. It will fit all sizes. The loop in the guide line goes around the release latch on top of the trailer coupling. The end result should be a perfectly aligned trailer, ready to couple to the pulling vehicle ball.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A backing assistance mechanism for attaching a hitch to a towing device comprising:
    a line in communication with a rotating trigger;
    the rotating trigger movably affixed to a shaft for rotational and axial movement upon the shaft, wherein the rotating trigger is oriented vertically with respect to the line, exaggerates movement of the line, and the rotating trigger is enclosed within a casing;
    at least one movement trigger;
    at least one movement indicator comprising at least one reed switch;
    a transmitter;
    a receiver; and
    signaling indicia.
2. The backing assistance mechanism of claim 1, wherein the at least one movement trigger comprises a magnet.
3. The backing assistance mechanism of claim 1, further comprising at least one lower movement indicator.
4. The backing assistance mechanism of claim 3, wherein the at least one lower movement indicator is formed from multiple movement indicators.
5. The backing assistance mechanism of claim 1, wherein the signaling indicia comprise visual indicia.
6. The backing assistance mechanism of claim 1, wherein the signaling indicia comprise auditory indicia.
7. The backing assistance mechanism of claim 1, wherein the rotating trigger includes at least one movable flange.
8. The backing assistance mechanism of claim 1, further comprising a distance detection unit.
9. The backing assistance mechanism of claim 1, further comprising an activating device on the line.
10. The backing assistance mechanism of claim 1, further comprising the rotating trigger including at least one elliptical shaped opening.
11. The backing assistance mechanism of claim 1, wherein the at least one movement indicator and at least one movement trigger do not contact one another to transmit a movement signal.
12. A method for positioning a hitch with relation to a towing device comprising;
    affixing a line between a towing device and a backing unit, wherein the backing unit includes a rotating trigger in communication with the line;
    positioning the rotating trigger vertically with respect to the line and placing the rotating trigger within a casing;
    translating movement of the line, which causes movement of the rotating trigger which in turn causes the rotating trigger to exaggerate movement of the line, into signals via at least one reed switch; and
    generating instructions from the signals regarding approaching the towing device.
13. The method of claim 12, further comprising the instructions being visual.

14. The method of claim 12, further comprising the instructions being auditory.

15. The method of claim 12, further comprising generating signals based on interaction between at least one movement indicator and at least one movement trigger.

16. The method of claim 14, wherein the at least one movement indicator comprises a magnet.

17. The method of claim 14, wherein the signals comprise radiofrequency signals.

18. The method of claim 15, wherein the at least one movement indicator and at least one movement trigger do not contact one another to transmit a movement signal.

* * * * *